United States Patent
Dick et al.

(10) Patent No.: US 7,343,761 B2
(45) Date of Patent: Mar. 18, 2008

(54) DEVICE FOR PRODUCING A GLASS ROD

(75) Inventors: Erhard Dick, Mitterteich (DE); Roland Fuchs, Mitterteich (DE); Erich Fischer, Mitterteich (DE); Wolfgang Münch, Bubenheim (DE); Anton Winkelmann, Ober-olm (DE); Robert Rühl, Mainz (DE)

(73) Assignee: Carl-Zeiss-Stiftung, Mainz (DE)

( * ) Notice: Subject to any disclaimer, the term of this patent is extended or adjusted under 35 U.S.C. 154(b) by 520 days.

(21) Appl. No.: 10/381,620

(22) PCT Filed: Aug. 14, 2001

(86) PCT No.: PCT/EP01/09363

§ 371 (c)(1),
(2), (4) Date: Aug. 26, 2003

(87) PCT Pub. No.: WO02/28788

PCT Pub. Date: Apr. 11, 2002

(65) Prior Publication Data

US 2004/0025540 A1 Feb. 12, 2004

(30) Foreign Application Priority Data

Sep. 29, 2000 (DE) .................... 100 48 815

(51) Int. Cl.
*C03B 17/04* (2006.01)

(52) U.S. Cl. ........................... 65/187; 65/71
(58) Field of Classification Search .......... 65/187, 65/87
See application file for complete search history.

(56) References Cited

U.S. PATENT DOCUMENTS

| | | | | |
|---|---|---|---|---|
| 2,402,924 A | * | 6/1946 | Snyder | 65/187 |
| 2,429,220 A | * | 10/1947 | Danner | 65/184 |
| 2,972,837 A | * | 2/1961 | Pinotti | 65/187 |
| 3,136,658 A | * | 6/1964 | Richards | 428/471 |
| 3,236,619 A | * | 2/1966 | Frye et al. | 65/184 |
| 3,360,354 A | * | 12/1967 | Bates | 65/184 |
| 3,364,004 A | * | 1/1968 | Cozine et al. | 65/187 |
| 5,080,705 A | * | 1/1992 | Ott et al. | 65/87 |
| 6,274,525 B1 | | 8/2001 | Zborowski et al. | 501/120 |

FOREIGN PATENT DOCUMENTS

DE    2112692    9/1972

(Continued)

*Primary Examiner*—Steven P. Griffin
*Assistant Examiner*—Queenie Dehghan
(74) *Attorney, Agent, or Firm*—Ohlandt, Greeley, Ruggiero & Perle, L.L.P.

(57) ABSTRACT

A device for the production of a glass rod is provided. The device has a Danner blowpipe constructed to avoid problems attributed to different heat expansion coefficients of the participating materials. The Danner blowpipe has an outer metal jacket surrounding a ceramic body and defines a supply end and a discharge end of the blowpipe. A clamping plate is provided at both the supply and discharge ends. The clamping plate on the discharge end is rigidly joined with a shaft and engages the outer metal jacket at the discharge end. The clamping plate on the supply end is joined in an axially displaceable manner on the shaft, which is rigidly joined with a pressure plate against displacement in an axial direction. A pressure spring is disposed between the pressure plate and the clamping plate on the supply end to urge the plates away from one another.

19 Claims, 1 Drawing Sheet

FOREIGN PATENT DOCUMENTS

| | | |
|---|---|---|
| DE | 3516920 | 11/1985 |
| DE | 198 03 327 | 12/1999 |
| DE | 19960211 | 7/2001 |
| EP | 04209722 | 7/1992 |
| EP | 09328324 | 12/1997 |
| EP | 11322350 | 11/1999 |
| JP | 04209722 | 7/1992 |
| JP | 09328324 | 12/1997 |
| JP | 11322350 | 11/1999 |

* cited by examiner

DEVICE FOR PRODUCING A GLASS ROD

BACKGROUND OF THE INVENTION

1. Field of the Invention

The invention concerns a device for producing a glass rod according to the so-called Danner process, particularly for producing a glass tube. Devices of the named type are known from a plurality of publications. Reference is made to DE 199 60,211 A1 only by way of example.

2. Description of Related Art

Such a device comprises a pipe, the so-called Danner blowpipe, which rotates slowly and which is generally found inside a heating muffle. Generally the Danner blowpipe is conical and is inclined by its longitudinal axis slightly toward the horizontal plane. On one end of the blowpipe—the larger end in the case of conical blowpipes—a continuous stream of molten glass is introduced, which forms a laminar trickling film on the jacket surface of the blowpipe. At the smaller end of the blowpipe, the glass rod is drawn off, either as a solid rod or as a tube. After reversing direction in the horizontal plane, the solidifying rod passes through a roller conveyor up to a drawing machine connected downstream. It is then broken down into segments of specific length.

The glass stream has a temperature of approximately 1300° C. when it arrives on the supply end of the Danner blowpipe and a temperature of approximately 1000° C. at the so-called a "drawing bulb". A cooling process thus takes place from the supply end to the discharge end. The cooling process proceeds by the introduction of heat from the heating muffle in controlled manner.

DE 198 03,327 C2 refers to a tube-pulling plant according to Danner for glass tubes. The plant comprises a carrier component of ceramics with metal coating.

DE 2,112,692 A1 describes a leading body for the production of tubes or rods of glass. Here, a hollow body is supported on a spindle. It is rigidly joined with the spindle on one end and is joined in a spring-displaceable manner on the other end.

SUMMARY OF THE INVENTION

The invention originates from a device with a Danner blowpipe of the named type, which is constructed in a particular way. Its peripheral wall is formed of an outer metal jacket as well as a ceramic body surrounded by the metal jacket. The metal jacket is predominantly comprised of special steel.

The heat expansion coefficients of the two materials are known to be very different. The coefficient of the metal is known to be substantially higher than that of the ceramic material. Since the temperature of the melt and thus also the temperature of the blowpipe are different from one case to the next, the different heat expansion coefficients of the two materials lead to problems of forming stability. This is a disadvantage both for the quality of the product as well as also for the service life of the entire device.

The object of the invention is to configure a device of the named type in such a way that the named problems which are attributed to different heat expansion coefficients of the participating materials are avoided. At the same time, the device will be of simple construction and inexpensive to produce.

This object is solved by the features of claim 1.

Devices according to the invention can be successfully used particularly in the production of glass tubes, and in fact, for any type of glass tubes, for example, brown glass tubes.

The device permits a relative displacement of the ceramic body and the metal jacket in the axial direction. Thus a displacement path is made available, which could take up the differences in expansion.

BRIEF DESCRIPTION OF THE DRAWINGS

The invention is explained on the basis of the drawings. The following are shown individually therein.

DETAILED DESCRIPTION OF THE INVENTION

Figure 1:
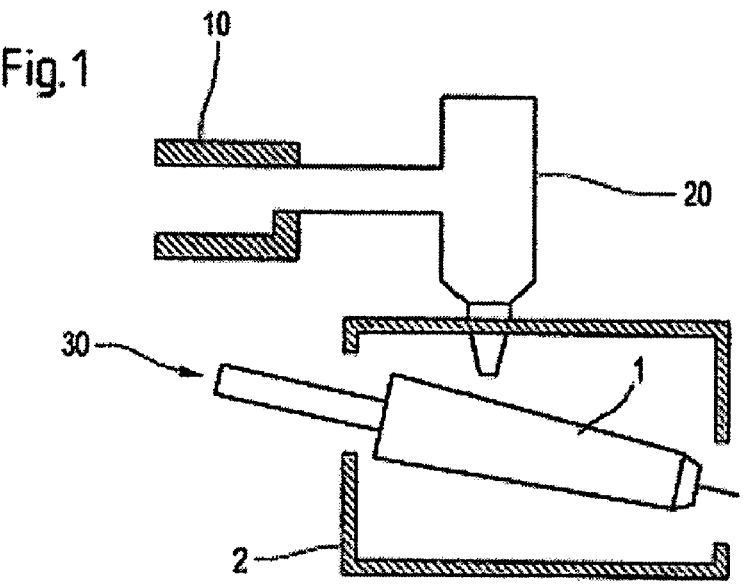
FIG. 1 illustrates the basic principle of a device of the named type in schematic representation.

The device shown in FIG. 1 is used by itself for the shaping. It is connected to the usual components (not shown), namely the drawing channel with the drawing path and the drawing machine with the separating device.

The device shown in FIG. 1 comprises a distributor 10 and a pot 20. The molten glass is discharged from the pot through a nozzle as a continuous stream and strikes the target tool, namely the inclined rotating blowpipe 1. The blowpipe 1 and the flowing-out opening from the nozzle are found in an oven 2, which assures a temperature gradient between the flowing-out opening from the nozzle and the second end. A blowing device 30 serves for sweeping the inner space of the glass tube to be drawn out with an overpressure opposite the ambient pressure. The glass is drawn out by the blowpipe and reverses direction in the horizontal plane (not shown here).

Figure 2:
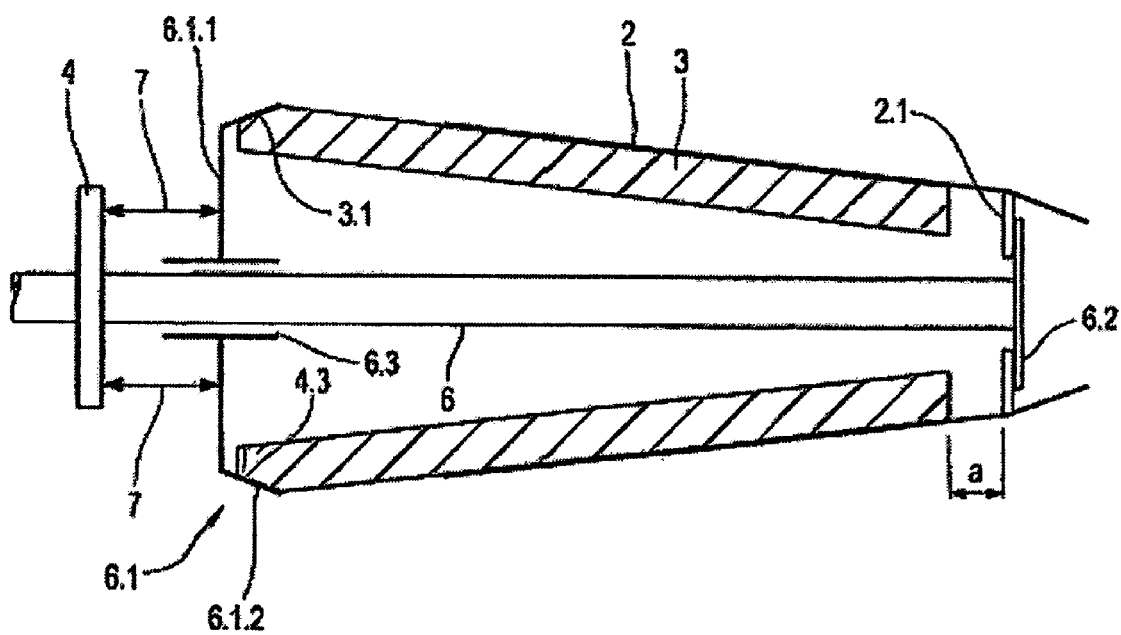
FIG. 2 shows the Danner blowpipe properly speaking in a partially cut-away orthogonal projection in an enlarged scale.

The blowpipe 1 shown in FIG. 2 is constructed as follows:

It has a peripheral wall, comprising an outer metal jacket 2 as well as a ceramic body 3. It additionally comprises a shaft 6 with clamping plates 6.1, 6.2.

As is seen, both the metal jacket 2 as well as also the ceramic body 3 are of conical configuration. Therefore, the larger end of the cone is the supply end—thus in the region of the clamping plate 6.1—, whereas the smaller end is the discharge end—thus in the region of the clamping plate 6.2. The ceramic body 3 has a constant wall thickness over the entire length. This is not absolutely necessary, however. The wall thickness could also increase or decrease toward the small end.

The clamping plate 6.2 is a circular disk. In the region of the discharge end, the metal jacket 2 is bent off at a specific angle to the longitudinal axis of the Danner blowpipe, in fact in the direction of an increasing conicity.

The clamping plate 6.1 is of particular configuration at the supply-side end: As is seen, it comprises a planar disk 6.1.1 as well as a bent-off part 6.1.2. Part 6.1.2 opens up toward the discharge end. The ceramic body 3 is chamfered here in such a way that a bearing surface 3.1 is formed. The bent-off part 6.1.2 of the clamping plate 6.1 has a counter-surface 4.3 complementary to the bearing surface 3.1 on its inner side. The two surfaces 3.1 and 4.3 are inclined at the same angle to the longitudinal axis of the Danner blowpipe. Together, they thus form a seat.

The jacket 2 has a collar 2.1 on its discharge-side end. This latter adjoins the clamping plate 6.2, either indirectly or directly. Shaft 6 and clamping plate 6.2 are joined together in a way that resists rotation, so that a torque can be introduced into the components of the Danner blowpipe via the shaft 6.

Shaft 6 is guided through clamping plate 6.1 at the supply end, for example, with the intermediate connection of a slide bearing 6.3, so that an axial displacement can occur between shaft 6 and clamping plate 6.1.

In the present case, an elastic force F acts in the direction of the arrow on the supply-side clamping plate 6.1, by means of pressure springs 7, which are supported against a pressure plate 4.

Based on this configuration, when an expansion occurs due to an increase in temperature, a displacement path a is provided—see the region of the clamping plate 6.2 on the discharge side. The reasoning behind this is that the metal jacket 2 does not extend over the entire length of the ceramic sheath 3. Rather, the supply-side end of the metal jacket 2 must be placed at a certain distance to the bent-off part 6.1.2 of the clamping plate 6.1.

Shaft 6 is mounted in a floating manner on the supply-side end, which is not shown in more detail here. A torque is introduced at this place.

The invention claimed is:

1. A device for producing a glass rod, comprising:
   a Danner blowpipe having a jacket surface defining a supply end and a discharge end; and
   a nozzle for introducing a glass stream onto the jacket surface at the supply end so that a glass film forms and is taken up at the discharge end,
   wherein the Danner blowpipe has an outer metal jacket and a ceramic body surrounded by the outer metal jacket, a clamping plate is provided at the supply end and a clamping plate is provided at the discharge end so that a displacement path is defined between the clamping plate at the discharge end and the ceramic body, the clamping plate on the discharge end is rigidly joined with a shaft and engages the outer metal jacket at the discharge end and the clamping plate on the supply end is joined in an axially displaceable manner on a supply-side of the shaft, which is rigidly joined with a pressure plate against displacement in an axial direction, and a pressure spring disposed between the pressure plate and the clamping plate on the supply end and presses the pressure plate and the clamping plate away from one another, wherein the outer metal jacket extends from the discharge end only over a part of a length of the ceramic body.

2. The device according to claim 1, wherein the outer metal jacket has a collar at the discharge end that supports the clamping plate at the discharge end.

3. The device according to claim 1, wherein the outer metal jacket has a conical shape with a larger end and a smaller end, and wherein the larger end is proximate the supply end and the smaller end is proximate the discharge end.

4. The device according to claim 1, wherein the Danner blowpipe is inclined at an angle to the horizontal plane.

5. A blowpipe for producing a grass tube, comprising:
   a shaft for rotating the blowpipe about an axis, said shaft having first plate and a second plate;
   a ceramic body having a first end and a second end, said ceramic body being disposed about said shaft so that said first end is proximate said first plate and said first end is movable with respect to said shaft along said axis;
   a resilient member urging said first plate and said first end away from one another; and
   a metallic sleeve having a second end opposite said first end of said ceramic body, said metallic sleeve being disposed about said ceramic body so that said second end of said metallic sleeve is rotatably engaged with said second plate and so that a displacement path is provided between said ceramic body and said second end of said metallic sleeve along said axis, wherein said metallic sleeve extends only over a part of a length of said ceramic body.

6. The blowpipe as in claim 5, further comprising a slide bearing disposed between said first end and said shaft.

7. The blowpipe as in claim 5, wherein said metallic sleeve has a minimum diameter at said second end.

8. The blowpipe as in claim 7, wherein said metallic sleeve has a conical shape.

9. The blowpipe as in claim 5, wherein said ceramic body has a constant wall thickness along said axis.

10. The blowpipe as in claim 5, wherein said first end comprises a chamfer defined on said ceramic body and a clamping plate engaging said chamfer.

11. The blowpipe as in claim 10, wherein said clamping plate has a planar portion and a bent portion.

12. The blowpipe as in claim 11, wherein said planar portion engages said resilient member so that said resilient member can urge said first plate and said first end away from one another.

13. The blowpipe as in claim 11, wherein said bent portion engages said chamfer.

14. A blowpipe for producing a glass tube, comprising:
   a shaft for rotating the blowpipe about an axis, said shaft having first plate and a second plate;
   a ceramic body having a first end and a second end, said ceramic body being disposed about said shaft so that said first end is proximate said first plate and said first end is movable with respect to said shaft along said axis;
   a metallic sleeve disposed about said ceramic body so that said second plate causes said shaft, metallic sleeve, and ceramic body to rotate together about said axis and so that a displacement path is provided between said ceramic body and said metallic sleeve along said axis at said second end of said ceramic body; and
   a slide bearing disposed between said first end and said shaft.

15. The blowpipe as in claim 14, wherein said metallic sleeve and said ceramic body have complimentary conical shapes.

16. The blowpipe as in claim 15, wherein said ceramic body has a constant wall thickness along said axis.

17. A blowpipe for producing a glass tube, comprising:
   a shaft for rotating the blowpipe about an axis, said shaft having first plate and a second plate;
   a ceramic body having a first end and a second end, said ceramic body being disposed about said shaft so that said first end is proximate said first plate and said first end is movable with respect to said shaft along said axis;
   a metallic sleeve disposed about said ceramic body so that said second plate causes said shaft, metallic sleeve, and ceramic body to rotate together about said axis and so that a displacement path is provided between said ceramic body and said metallic sleeve along said axis at said second end of said ceramic body; and
   a resilient member urging said first plate and said first end away from one another.

18. The blowpipe as in claim 17, wherein said metallic sleeve and said ceramic body have complimentary conical shapes.

19. The blowpipe as in claim 18, wherein said ceramic body has a constant wall thickness along said axis.

* * * * *